(12) United States Patent
Bondugula et al.

(10) Patent No.: US 12,014,271 B2
(45) Date of Patent: *Jun. 18, 2024

(54) TRAINING IMAGE CLASSIFIERS

(71) Applicant: ObjectVideo Labs, LLC, Tysons, VA (US)

(72) Inventors: Sravanthi Bondugula, Vienna, VA (US); Gang Qian, McLean, VA (US); Sung Chun Lee, Fairfax, VA (US); Sima Taheri, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,282

(22) Filed: Feb. 10, 2023

(65) Prior Publication Data

US 2023/0196106 A1    Jun. 22, 2023

Related U.S. Application Data

(63) Continuation of application No. 17/087,870, filed on Nov. 3, 2020, now Pat. No. 11,580,333.

(Continued)

(51) Int. Cl.
*G06N 3/08*    (2023.01)
*G06F 18/214*    (2023.01)
(Continued)

(52) U.S. Cl.
CPC .......... *G06N 3/08* (2013.01); *G06F 18/2148* (2023.01); *G06T 7/194* (2017.01); *G06V 10/25* (2022.01);
(Continued)

(58) Field of Classification Search
CPC ...... G06K 9/6257; G06N 3/0454; G06N 3/08; G06T 7/194; G06V 10/25; G06V 10/255; G06V 10/82
See application file for complete search history.

(56) References Cited

U.S. PATENT DOCUMENTS 9,158,995 B2    10/2015    Rodriguez-Serrano et al.
10,032,072 B1*    7/2018    Tran ........................ G06F 18/28
(Continued)

OTHER PUBLICATIONS

Bo Zhao, "A Survey on Deep Learning-based Fine-grained Object Classification and Semantic Segmentation," Jan. 18, 2017, International Journal of Automation and Computing, 14, pp. 120-130.*

(Continued)

*Primary Examiner* — Omar S Ismail
(74) *Attorney, Agent, or Firm* — Fish & Richardson P.C.

(57) ABSTRACT

Methods, systems, an apparatus, including computer programs encoded on a storage device, for training an image classifier. A method includes receiving an image that includes a depiction of an object; generating a set of poorly localized bounding boxes; and generating a set of accurately localized bounding boxes. The method includes training, at a first learning rate and using the poorly localized bounding boxes, an object classifier to classify the object; and training, at a second learning rate that is lower than the first learning rate, and using the accurately localized bounding boxes, the object classifier to classify the object. The method includes receiving a second image that includes a depiction of an object; and providing, to the trained object classifier, the second image. The method includes receiving an indication that the object classifier classified the object in the second image; and performing one or more actions.

20 Claims, 4 Drawing Sheets

Related U.S. Application Data

(60) Provisional application No. 62/934,067, filed on Nov. 12, 2019.

(51) Int. Cl.
*G06T 7/194* (2017.01)
*G06V 10/20* (2022.01)
*G06V 10/25* (2022.01)
*G06V 10/774* (2022.01)
*G06V 10/82* (2022.01)

(52) U.S. Cl.
CPC ........ *G06V 10/255* (2022.01); *G06V 10/7747* (2022.01); *G06V 10/82* (2022.01)

(56) References Cited

U.S. PATENT DOCUMENTS

| | | | | |
|---|---|---|---|---|
| 10,318,848 | B2 | 6/2019 | Dijkman et al. | |
| 10,579,897 | B2 | 3/2020 | Redmon et al. | |
| 10,872,276 | B2 | 12/2020 | Han et al. | |
| 2008/0025568 | A1* | 1/2008 | Han | G06V 10/50 382/103 |
| 2014/0201126 | A1* | 7/2014 | Zadeh | A61B 5/165 706/52 |
| 2014/0270350 | A1* | 9/2014 | Rodriguez-Serrano | G06F 18/21 382/103 |
| 2015/0030255 | A1* | 1/2015 | Wu | G06V 10/809 382/224 |
| 2016/0174902 | A1* | 6/2016 | Georgescu | G06V 10/454 600/408 |
| 2016/0247101 | A1* | 8/2016 | Agrawal | G06V 20/59 |
| 2017/0083792 | A1* | 3/2017 | Rodríguez-Serrano | G06V 20/63 |
| 2017/0206431 | A1* | 7/2017 | Sun | G06V 10/454 |
| 2017/0330059 | A1* | 11/2017 | Novotny | G06V 10/7515 |
| 2018/0137642 | A1* | 5/2018 | Malisiewicz | G06V 30/19173 |
| 2018/0204076 | A1* | 7/2018 | Tripathi | G06V 10/764 |
| 2019/0102646 | A1* | 4/2019 | Redmon | G06V 20/20 |
| 2019/0108640 | A1* | 4/2019 | Zhang | G06N 3/084 |
| 2019/0147221 | A1* | 5/2019 | Grabner | G06T 7/75 382/103 |
| 2020/0025877 | A1* | 1/2020 | Sarkis | G01S 7/412 |
| 2020/0027002 | A1* | 1/2020 | Hickson | G06F 18/2431 |
| 2020/0097818 | A1* | 3/2020 | Li | G06N 3/08 |
| 2020/0175352 | A1* | 6/2020 | Cha | G06N 3/04 |
| 2020/0320769 | A1* | 10/2020 | Chen | G06F 18/214 |
| 2021/0142114 | A1* | 5/2021 | Bondugula | G06N 3/045 |

OTHER PUBLICATIONS

Yousri Kessentini ,"A two-stage deep neural network for multi-norm license plate detection and recognition," Jun. 18, 2019, Expert Systems With Applications 136 (2019), pp. 160-167.*

Jingjing Zhang,"License Plate Localization in Unconstrained Scenes Using a Two-Stage CNN-RNN," Feb. 19, 2019, IEEE Sensors Journal, vol. 19, No. 13, Jul. 1, 2019, pp. 5256-5263.*

Jae Shin Yoon,"Pixel-Level Matching for Video Object Segmentation using Convolutional Neural Networks," Oct. 2017, Proceedings of the IEEE International Conference on Computer Vision (ICCV), 2017, pp. 2167-2174.*

Lichao Huang,"DenseBox: Unifying Landmark Localization with End to End Object Detection," Sep. 19, 2015, Computer Vision and Pattern Recognition, pp. 1-6.*

Dahun Kim,"Two-Phase Learning for Weakly Supervised Object Localization," Oct. 2017, Proceedings of the IEEE International Conference on Computer Vision (ICCV), 2017, pp. 3534-3539.*

Yuan Li ,"Deep attention network for joint hand gesture localization and recognition using static RGB-D images," Feb. 10, 2018, Information Sciences 441 (2018), pp. 66-74.*

Zhao et al., "A Survey on Deep Learning-based Fine-grained Object Classification and Semantic Segmentation," International Journal of Automation and Computing, Apr. 2017, 14(2):119-135.

Kessentini et al., "A two-stage deep neural network for multi-norm license plate detection and recognition," Expert Systems With Applications, Jun. 18, 2019, 136(2019):159-170 (12 pages).

Huang et al., "DenseBox: Unifying Landmark Localization with End to End Object Detection," Computer Vision and Pattern Recognition, Sep. 19, 2015, pp. 1-13.

Kim et al., "Two-Phase Learning for Weakly Supervised Object Localization," Proceedings of the IEEE International Conference on Computer Vision (ICCV), Oct. 2017, pp. 3534-3543 (10 pages).

Yoon et al., "Pixel-Level Matching for Video Object Segmentation using Convolutional Neural Networks," Proceedings of the IEEE International Conference on Computer Vision (ICCV), Oct. 2017, pp. 2167-2176 (10 pages).

Zhang et al., "License Plate Localization in Unconstrained Scenes Using a Two-Stage CNN-RNN," IEEE Sensors Journal, Jul. 1, 2019, 19(13):5256-5265 (10 pages).

Li et al., "Deep attention network for joint hand gesture localization and recognition using static RGB-D images," Print submitted to Journal of Information Sciences, Jul. 19, 2020, 31 pages (color copy).

* cited by examiner

TRAINING IMAGE CLASSIFIERS

CROSS-REFERENCE TO RELATED APPLICATION

This application is a continuation of U.S. application Ser. No. 17/087,870, filed Nov. 3, 2020, which claims the benefit of the U.S. Provisional Patent Application No. 62/934,067 filed Nov. 12, 2019. The disclosure of each of the foregoing applications is incorporated herein by reference.

TECHNICAL FIELD

This disclosure application relates generally to computer vision technology.

BACKGROUND

Many properties are equipped with monitoring systems that include sensors and connected system components. Some residential-based monitoring systems include cameras. Cameras can use computer vision technology to analyze images using deep learning neural network models.

SUMMARY

Techniques are described for training image classifiers. An image classifier can classify an object within an image, e.g., by labeling areas of the image that correspond to the object with one or more characteristics of the object. For example, an image classifier can classify a vehicle within an image by applying a label "vehicle" to the areas of the image that correspond to the vehicle.

A two-stage training approach can be used to improve accuracy and efficiency of deep learning neural network image classifier models. The two-stage training approach can be used to train image classifiers to accurately classify poorly localized detections of objects of interest within images captured by a camera.

A poorly localized detection can be a detection that includes only a partial image of an object of interest, or an entire image of an object of interest but also a large amount of background. For example, a poorly localized detection of a person may include only a limb of the person. In another example, a poorly localized detection of a person may include the entire person but where the person is only in a quarter of the area where the person was detected.

An accurately localized detection can be a detection that includes a whole, or nearly whole, image of an object of interest, and a small amount of background. For example, an accurately localized detection of a person may include images of the person's torso and head, and some of the person's limbs. In another example, an accurately localized detection of a person may include the entire person where the person occupies three quarters of the area where the person was detected.

In the two-stage training approach, a first training stage uses poorly localized bounding boxes around objects of interest for training at a first learning rate. A second training stage uses accurately localized bounding boxes around objects of interest for training at a second learning rate that is lower than the first learning rate. The two-stage training approach can improve the performance of accurately classifying images.

In the first stage, a classifier model is trained to accurately classify images with any amount of an object present in the image. The first stage produces an initial trained classifier model that, if used for inference, would likely produce many false positive detections.

In the second stage, the classifier model is slowly refined using accurately localized bounding boxes. To refine the classifier model in the second stage, neural network weights are adjusted slowly by using a very small learning rate to train the classifier model to clearly distinguish between background and objects, thereby reducing false positive detections. The two-stage training approach can thus improve classifier performance when performing inference on both poorly localized detections and accurately localized detections.

In some examples, a camera with image classification can be incorporated into a component of a property monitoring system, such as a doorbell. In some examples, a camera may be a separate device, e.g., a surveillance camera located inside or outside the property. A camera may include a computer that can use computer vision to detect, localize, and classify objects of interest within an image. In some examples, the computer can be an internal component of the camera. In some examples, the computer can be an external computer that can communicate operably with the camera. For example, the external computer can be a control unit or monitoring server of a monitoring system. The camera can communicate with the external computer, for example, over a network.

Objects of interest can include, for example, humans, vehicles, and animals. The objects of interest may be moving or stationary. In some examples, objects of interest detected by a camera can trigger a property monitoring system to perform one or more actions. For example, detections of objects of interest that meet pre-programmed criteria may trigger the property monitoring system to send a notification to a resident of the property or to adjust a setting of the property monitoring system. Example criteria can include a position of an animal within a certain range of the property, a threshold number of humans approaching the property, and/or a vehicle approaching the property late at night. It is desirable that a camera accurately detect and classify objects in order to send valid notifications to the residents.

A camera that can detect and classify objects with an internal computer can improve latency and privacy, compared to a camera that detects and classifies objects with an external computer. An internal computer can perform detections and classifications more quickly and more securely than an external computer, since the camera does not need to transmit data to the external computer over a network. However, an internal computer may need to operate with lower power consumption, compared to an external computer. Additionally, the internal computer may have reduced memory and computational power available, compared to an external computer.

To operate at lower powers and with reduced computational capabilities, a computer can use background removal techniques to prefilter images before classifying objects within the images. Background removal techniques can include detecting and capturing localized motion bounding boxes with a bounding box generator. Background images can then be removed, and the bounding boxes can be sent to classifier models. The classifier models can perform inference on the bounding boxes by classifying objects within the bounding boxes. The bounding boxes obtained using the background removal techniques are often poorly localized bounding boxes. State of the art classifiers trained in a traditional way typically perform poorly in classifying the poorly localized bounding boxes.

The two-stage training approach can be used to train image classifier models to obtain high accuracy detections at low powers and with reduced computational capabilities. By removing background images, the classifier can more quickly and efficiently classify objects with reduced memory requirements. The two-stage training approach can therefore improve classification accuracy and enable classifier models to operate at low powers and with reduced memory. Thus, the two-stage training approach may enable high accuracy object detections using internal computers on camera devices.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
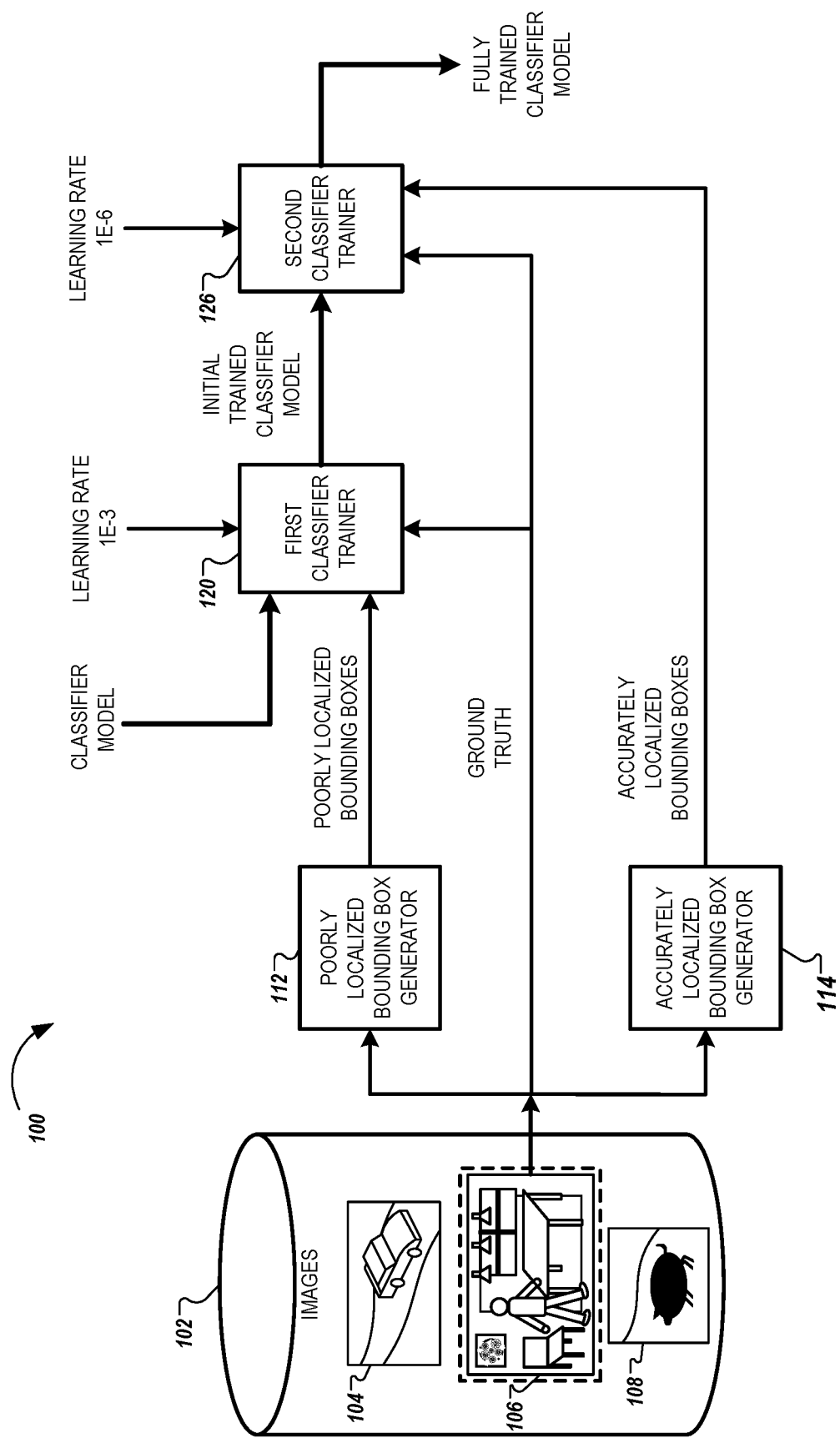
FIG. 1 illustrates an example system for training image classifiers.

FIG. 1 illustrates an example system 100 for training image classifiers. The system 100 can be used for training classifiers that can be used by cameras, e.g., surveillance cameras. The system 100 uses a two-stage training process to train a classifier model to classify objects of interest in images.

The system 100 can be implemented as part of a computing system, e.g., a camera device or a monitoring server of a property monitoring system. Components of the system 100 can be provided as one or more computer executable software modules or hardware modules. That is, some or all of the functions of poorly localized bounding box generator 112, accurately localized bounding box generator 114, first classifier trainer 120, and second classifier trainer 126 can be provided as a block of computer code, which upon execution by a processor, causes a processor to perform functions described below. Some or all of the functions of the components of system 100 can be implemented in electronic circuitry, e.g., by individual computer systems (e.g., servers), processors, microcontrollers, a field programmable gate array (FPGA), or an application specific integrated circuit (ASIC).

Cameras can perform video analysis on images. Video analysis can include various processes, e.g., object detection, object localization, and image classification. In some examples, background removal techniques can be used to improve image classification and reduce required computational power.

In an example background removal technique, a bounding box generator generates a bounding box around an object of interest in an image. The bounding box can be an area of the image where the object of interest is positioned. The bounding box can coarsely outline the object of interest using, for example, a rectangular shape. The bounding box generator can remove the background that is located outside of the bounding box.

The classifier can classify the object of interest within the bounding box. The classifier may be able to classify an object of interest, for example, as a person or an animal. In some examples, the classifier may be able to further classify a person, e.g., as an adult or a child, or may be able to further classify an animal, e.g., as a dog or a cat.

A classifier model can be a neural network, e.g., a convolutional neural network (CNN). The classifier model can be trained to classify objects of interest through a deep learning process using a large database of images with a known ground truth.

The system 100 includes an image database 102. The image database 102 can include many images. For example, the image database 102 can include images 104, 106, and 108. Each image can be an image frame that was captured by a video camera. The image database 102 can include images from one camera or from any number of cameras. The image database 102 can include many images, e.g., thousands or millions of images.

The images can include scenes captured from various locations and camera installations. The images can include any type of images. For example, the images can include visual light images, infrared images, or radio wave images. In some examples, the images can include a combination of one or more types of images, e.g., visual light images with infrared illumination.

The images of the image database 102 can include objects of interest, such as vehicles, people, and animals. For example, the image 104 includes a vehicle, the image 106 includes a person, and the image 108 includes an animal. Each image can include more than one object of interest. For example, an image may include both a person and an animal.

In the example of FIG. 1, the system 100 selects an image for training, e.g., the image 106. The image 106 includes a person and a background.

A poorly localized bounding box generator 112 receives the image 106 and generates a poorly localized bounding box around the object of interest, e.g., the person. The poorly localized bounding box generator 112 may include one or more software modules, one or more hardware modules, or a combination of both. A poorly localized bounding box can be, for example, a bounding box within which a percentage area of the background is greater than a threshold percentage. For example, a bounding box may include a number of image pixels. A poorly localized bounding box can be a bounding box within which more than a threshold number or percentage of pixels correspond to the background. An example threshold can be, e.g., greater than 60% of pixels within the bounding box corresponding to the background. In some examples, a poorly localized bounding box may include a greater area of the background compared to the area of the object of interest within the bounding box.

In some examples, a poorly localized bounding box can be a bounding box that is poorly localized in relation to an optimized bounding box around the object of interest. The optimized bounding box can be the smallest box around the object of interest that includes the entire object of interest. A poorly localized bounding box may include the entire object of interest, but may be, for example, 50% larger than the optimized bounding box.

In some examples, a poorly localized bounding box can be a bounding box that includes less than a threshold portion of the object of interest. For example, an object of interest may be represented in an image by a number of image pixels. A poorly localized bounding box can be a bounding box that includes less than a threshold number or percentage of pixels that correspond to the object of interest. An example threshold can be, e.g., fewer than 80% of pixels that correspond to the object of interest being within the bounding box. In some examples, the poorly localized bounding box generator 112 can generate more than one poorly localized bounding box from the image 106. Poorly localized bounding boxes are described in greater detail with reference to FIG. 2.

An accurately localized bounding box generator 114 receives the image 106 and generates an accurately localized bounding box around the object of interest, e.g., the person. The accurately localized bounding box generator 114 may include one or more software modules, one or more hardware modules, or a combination of both. An accurately localized bounding box can be, for example, a bounding box within which a percentage area of the background is less than a threshold percentage. For example, a bounding box may include a number of image pixels. An accurately localized bounding box can be a bounding box within which less than a threshold number or percentage of pixels correspond to the background. An example threshold can be, e.g., less than 40% of pixels within the bounding box corresponding to the background. In some examples, an accurately localized bounding box may include a greater area of the object of interest compared to the area of the background within the bounding box.

In some examples, an accurately localized bounding box can be a bounding box that is accurately localized in relation to an optimized bounding box around the object of interest. The optimized bounding box can be the smallest box around the object of interest that includes the entire object of interest. An accurately localized bounding box may include the entire object of interest, and may be, for example, 5% larger than the optimized bounding box.

In some examples, an accurately localized bounding box can be a bounding box that includes greater than a threshold portion of the object of interest. For example, an object of interest may include a number of image pixels. An accurately localized bounding box can be a bounding box that includes greater than a threshold number or percentage of pixels that correspond to the object of interest. An example threshold can be, e.g., greater than 80% of pixels that correspond to the object of interest being within the bounding box. In some examples, the accurately localized bounding box generator 114 can generate more than one accurately localized bounding box from the image 106. Accurately localized bounding boxes are described in greater detail with reference to FIG. 2.

The image 106 includes a known ground truth. The ground truth can include an accurately localized bounding box around the person in the image 106. In some examples, the ground truth can include an optimized bounding box around the person in the image 106. The ground truth can also include a classification label, e.g., "person." The ground truth can be pre-labeled and stored with the image 106 in the image database 102.

The system 100 provides the poorly localized bounding boxes to a first classifier trainer 120, and the accurately localized bounding boxes to a second classifier trainer 126. The system 100 also provides the ground truth to both the first classifier trainer 120 and to the second classifier trainer 126.

The first classifier trainer 120 and the second classifier trainer 126 each use a programmed learning rate. A learning rate controls the rate at which a neural network model learns. Specifically, the learning rate can be an amount by which weights of a model are updated with each training example or batch of training examples. A higher learning rate allows a model to train faster than a lower learning rate. However, a higher learning rate may result in less model accuracy compared to a lower learning rate.

In a first training stage, the first classifier trainer 120 trains a classifier model at a first learning rate. The first classifier trainer 120 may train the classifier model at a first learning rate of, for example, $1 \times 10^{-3}$. The first classifier trainer 120 trains the classifier model based on the poorly localized bounding boxes and the ground truth. For example, the classifier model can classify the object of interest in a poorly localized bounding box of the image 106. The first classifier trainer 120 can then compare the classification to the ground truth of the image 106 to evaluate an accuracy of the classifier model. Based on the accuracy of the classifier model, the first classifier trainer 120 can update weights of the classifier model to improve classification accuracy of poorly localized bounding boxes. By training the classifier model on the poorly localized bounding boxes, the classifier model can learn to more accurately classify images with any amount of an object of interest present in the image.

After training the classifier model at the first learning rate, the first classifier trainer 120 outputs an initial trained classifier model to a second classifier trainer 126. The initial trained classifier model may have a high accuracy for classifying objects of interest but may have poor accuracy for classifying background. For example, as a result of training on poorly localized bounding boxes, the initial trained classifier model may classify objects that are only partially visible in an image, producing false alarms. A second training stage can be used to improve the model accuracy for differentiating object of interest from background. The second training stage can reduce the number of false alarms produced by the classifier model.

In the second training stage, the second classifier trainer 126 trains the initial trained classifier model at a second learning rate that is lower than the first learning rate. For example, the second learning rate may be $1 \times 10^{-6}$. The second classifier trainer 126 trains the initial trained classifier model based on the accurately localized bounding boxes and the ground truth. For example, the initial trained classifier model can classify the object of interest in an accurately localized bounding box of the image 106. The second classifier trainer 126 can then compare the classification to the ground truth to evaluate an accuracy of the initial trained classifier model. Based on the accuracy of the initial trained classifier model, the first classifier trainer 120 can update weights of the initial trained classifier model to improve classification accuracy of accurately localized bounding boxes.

By training the initial trained classifier model on the accurately localized bounding boxes, the accuracy of the initial trained classifier model can be refined. The second classifier trainer 126 slowly trains on the accurately localized bounding boxes using the second learning rate that is lower than the first learning rate. Thus, the second classifier trainer 126 rectifies the initial trained classifier model by fine-tuning the weights of the model. The classifier model can thus reinforce the model's response to true object classes and learn to accurately distinguish between objects of interest and background, thereby reducing false alarm detections.

The second classifier trainer 126 outputs a fully trained classifier model. The fully trained classifier model has improved accuracy for both poorly localized detections and accurately localized detections, compared to a single-stage training process. The fully trained classifier model can be used for inference, e.g., to classify objects in images for which the ground truth is unknown.

The fully trained classifier model may be used in conjunction with a camera. For example, a computer component of a camera can use the fully trained classifier model to perform object classification. The camera can capture images, and the object classifier can classify objects within the images. In some examples, the object classifier can classify objects within the images in real-time.

The two-stage fully trained classifier model can more accurately classify objects of interest and differentiate objects of interest from background, compared to a single-stage trained classifier model or a classifier model trained only with accurately localized bounding boxes. The two-stage fully trained classifier model can also be used to perform accurate classification at low power consumption and with low memory usage.

The two-stage training process described with reference to FIG. 1 can be used to train a classifier model directly from a customized dataset. For example, instead of using a model that was pretrained on a generic dataset, an untrained classifier model can be trained directly on the training images of the image database 102. Thus, the two-stage training process can be used when pretrained models are not available or when it is undesirable to use a pretrained model.

Figure 2:
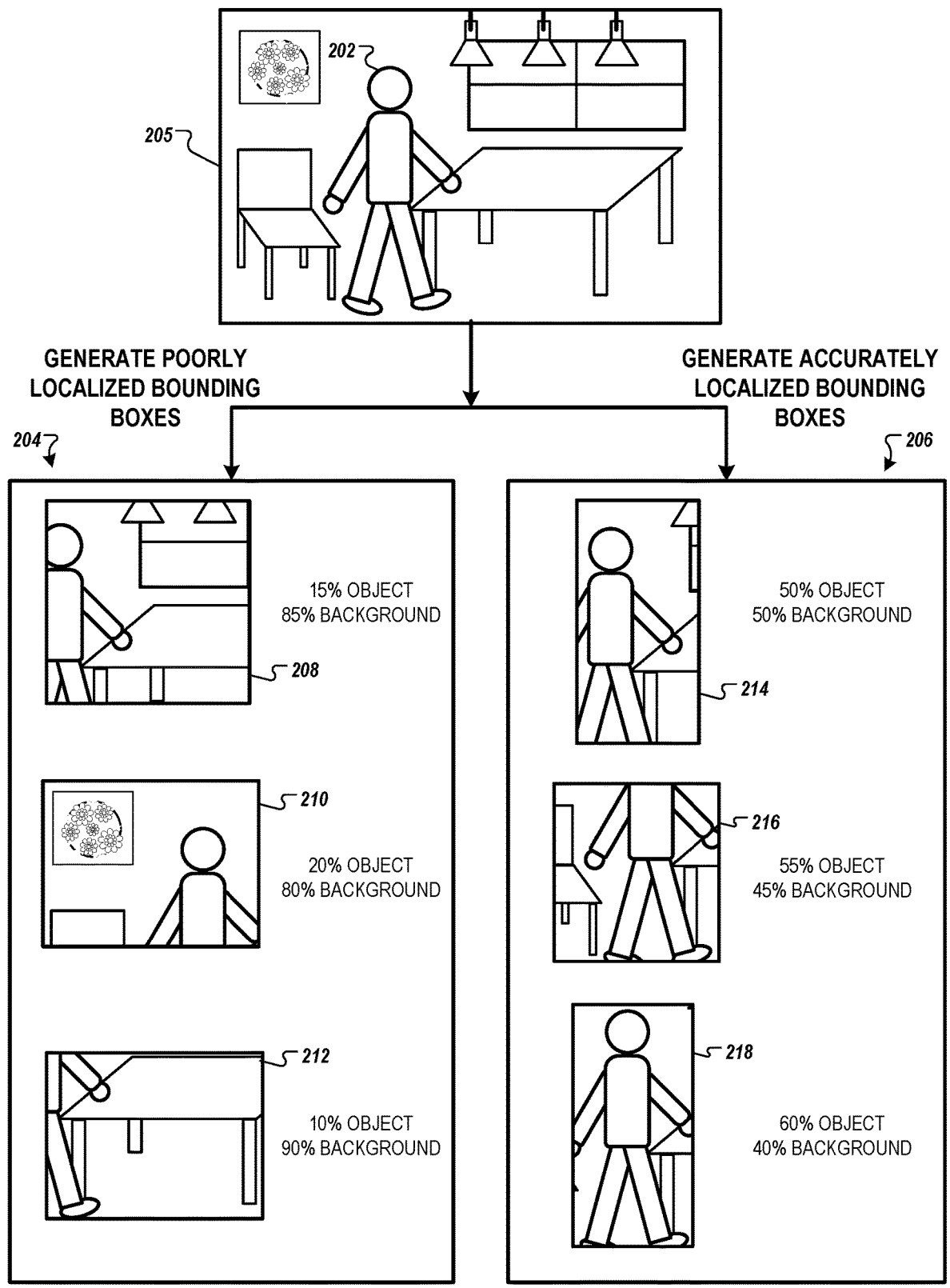
FIG. 2 illustrates an example image and example bounding boxes that can be used for training image classifiers.

FIG. 2 illustrates an example image 205 and example sets of bounding boxes 204, 206 that can be used for training classifiers.

To be able to classify images containing poorly localized objects, the poorly localized bounding box generator 112 and the accurately localized bounding box generator 114 generate training data by including images containing only a portion of an object present in an image. The training data can be generated through data augmentation. In data augmentation, given an image containing an object, the poorly localized bounding box generator 112 and the accurately localized bounding box generator 114 can randomly select regions containing the object by controlling the amount of overlap between the bounding box and the object.

The first training stage dataset includes training images that contain an object in a small portion of a bounding box, with a remainder of the bounding box as background. By first training on the poorly localized bounding boxes, the training process incorporates context around the object to improve the performance of the classifier model.

The image 205 includes a person 202 that is an object of interest. The image 205 also includes a background. The background includes a chair, wall art, a window, lights, and a table. The image 205 can be a training image, e.g., from the image database 102.

The image 205 may have a known ground truth. The ground truth can include an accurately localized bounding box around the person 202. The ground truth can also include a classification label, e.g., "person." The ground truth can be pre-labeled and stored with the image 205 in the image database 102.

The poorly localized bounding box generator 112 generates a set of poorly localized bounding boxes 204 from the image 205. The set of poorly localized bounding boxes 204 can include bounding boxes of any size and dimension. The example set of poorly localized bounding boxes 204 includes three randomly generated poorly localized bounding boxes. However, the poorly localized bounding box generator 112 can randomly generate any number of poorly localized bounding boxes that each include a portion of the image 205.

The poorly localized bounding box generator 112 can be programmed to generate a set of poorly localized bounding boxes 204 that each meet one or more criteria. For example, the poorly localized bounding box generator 112 can be programmed to generate poorly localized bounding boxes within which a percentage area of the background is greater than a threshold percentage.

In some examples, the poorly localized bounding box generator 112 can generate bounding boxes 204 that are poorly localized in relation to an optimized bounding box that is the smallest box that includes the entire object of interest. A poorly localized bounding box may include the entire object of interest, but may be greater than a threshold percentage larger than the optimized bounding box. For example, a poorly localized bounding box may be more than 30% larger than the optimized box.

In the example of FIG. 2, each poorly localized bounding box 204 includes a greater percentage of area that corresponds to background than corresponds to the object of interest, e.g., the person 202. Each poorly localized bounding box 204 can include a random percentage of pixels that include the object of interest. For example, the bounding box 208 includes a portion of the person 202 that includes part of the person's head and torso, one arm, and parts of two legs. The bounding box 208 also includes substantial portions of the table, the lights, and the window. Overall, 15% of the area of bounding box 208 includes pixels that correspond to the object of interest, while 85% of the area of the bounding box 208 includes pixels that correspond to background. Thus, the bounding box 208 is a poorly localized bounding box 204.

Bounding boxes 210 and 212 also include portions of the person 202 and substantial portions of the background, e.g., the bounding boxes 210 and 212 each include more than 50% background. In the bounding box 210, 20% of the area includes pixels that correspond to the object of interest, while 80% of the area of the bounding box 210 includes pixels that correspond to background. The bounding box 212 includes 10% pixels that correspond to the object of interest, and 90% pixels that correspond to background. The bounding boxes 208, 210, and 212 are generated from the same image 205. Yet the bounding boxes 208, 210, and 212 each can be different sizes and dimensions, and can each include different regions of the image 205.

The accurately localized bounding box generator 114 generates set of accurately localized bounding boxes 206 from the image 205. The set of accurately localized bounding boxes 206 can include bounding boxes of any size and dimension. The example set of accurately localized bounding boxes 206 includes three randomly generated accurately localized bounding boxes. However, the accurately localized bounding box generator 116 can randomly generate any number of accurately localized bounding boxes that each include a portion of the image 205.

The accurately localized bounding box generator 114 can be programmed to generate set of accurately localized bounding boxes 206 that each meet one or more criteria. For example, the accurately localized bounding box generator 114 can be programmed to generate accurately localized bounding boxes within which a percentage area of the background is less than a threshold percentage.

In some examples, the accurately localized bounding box generator 114 can generate bounding boxes 204 that are accurately localized in relation to an optimized bounding box that is the smallest box that includes the entire object of interest. Due to varying shapes of objects of interest, the rectangular optimized bounding box may include a sizeable portion of background. For example, an optimized bounding box around a person walking likely includes a sizeable portion of background, e.g., 20% or 30%. In contrast, an optimized bounding box around a more rectangular object, e.g., a vehicle, may include a smaller portion of background, e.g., 5% or 10%. An accurately localized bounding box may include the entire object of interest, and may be less than a threshold percentage larger than the optimized bounding box. For example, an accurately localized bounding box may be less than 10% larger than the optimized bounding box.

An example bounding box 218 includes nearly the entire person 202. Due to the shape of the person 202, the bounding box 218 includes 60% object and 40% background. An optimized bounding box that includes the entire person with minimal background would likely include approximately 70% object and 30% background. Thus, though the bounding box 218 includes 40% background, the bounding box 218 might only be 10% larger than the optimized bounding box, and therefore could be considered 90% accurately localized. The bounding box 218 can be more accurately localized by removing background area, e.g., the small amount of background above the person's head in the bounding box 218.

In comparison with bounding box 218, the bounding box 214 includes nearly the entire person 202, and includes 50% object and 50% background. As described above, the optimized bounding box would likely include approximately 70% object and 30% background. Thus, the bounding box 214 might be 20% larger than the optimized bounding box, and could be considered 80% accurately localized. The bounding box 214 can be more accurately localized by removing background area, e.g., the background areas to the right of the person 202 and above the person's head in the bounding box 214.

In the example of FIG. 2, each accurately localized bounding box 206 includes a greater or equal percentage of area that corresponds to the object of interest than corresponds to background. Each accurately localized bounding box 206 can include a random percentage of pixels that include the object of interest. For example, the bounding box 214 includes a portion of the person 202 that includes the person's entire head and torso, one entire arm, and parts of one arm and two legs. The bounding box 214 also includes small portions of the table, the lights, and the window. Overall, 50% of the area of bounding box 214 includes pixels that correspond to the object of interest, while 50% of the area of the bounding box 214 includes pixels that correspond to background. Thus, the bounding box 214 is an accurately localized bounding box 206.

Bounding boxes 216 and 218 also include portions of the person 202 and small portions of background, e.g., the bounding boxes 216 and 218 each include less than or equal to 50% background. In the bounding box 216, 55% of the area includes pixels that correspond to the object of interest, while 45% of the area of the bounding box 216 includes pixels that correspond to background. The bounding box 216 includes 60% pixels that correspond to the object of interest, and 40% pixels that correspond to background. The bounding boxes 214, 216, and 218 are generated from the same image 205 and are all accurately localized bounding boxes. Yet the bounding boxes 214, 216, and 218 each can be different sizes and dimensions, and can each include different regions of the image 205.

The poorly localized bounding box generator 112 and the accurately localized bounding box generator 114 can each generate multiple bounding boxes from a single image, e.g., the image 205. The system 100 can use the set of poorly localized bounding boxes 204 and the set of accurately localized bounding boxes 206 as training data for the classifier model. The set of poorly localized bounding boxes 204 can be used by the first classifier trainer for first stage training, while the set of accurately localized bounding boxes 206 can be used by the second classifier trainer for second stage training.

Figure 3:
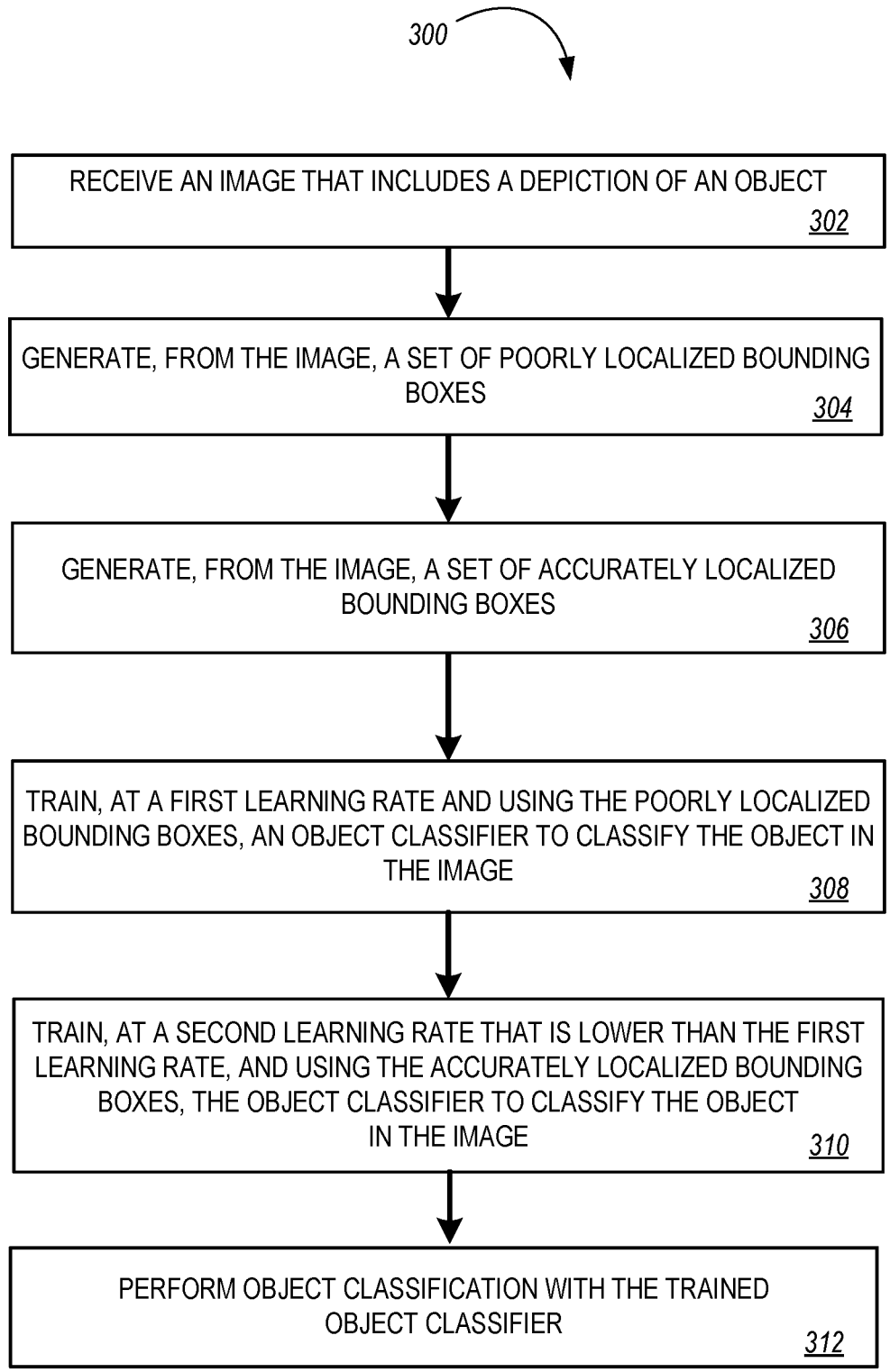
FIG. 3 is a flow chart illustrating an example of a training process for image classifiers.

FIG. 3 is a flow chart illustrating an example of a training process 300 for classifiers. The process 300 can be performed by a computing system, e.g., the system 100. In some implementations, the process 300 can be performed by a camera device. In some implementations, the process 300 can be performed by one or more computer systems that communicate electronically with the camera device, e.g., over a network. For example, the process 300 can be performed by a control unit or a monitoring server of a monitoring system.

Briefly, process 300 includes receiving an image that includes a depiction of an object (302), generating, from the image, a set of poorly localized bounding boxes (304), generating, from the image, a set of accurately localized bounding boxes (306), training, at a first learning rate and using the poorly localized bounding boxes, an object classifier to classify the object in the image (308), training, at a second learning rate that is lower than the first learning rate, and using the accurately localized bounding boxes, the object classifier to classify the object in the image (310), and performing object classification with the trained object classifier (312).

In additional detail, the process 300 includes receiving an image that includes a depiction of an object (302). The image can be, for example, one of the images 104, 106, or 108 from the image database 102. The object can be an object of interest, e.g., a vehicle, person, or animal. For example, the object can be the person 202 in the image 205. The image can also include a depiction of background. For example, the image 205 includes a depiction of background including a table, a chair, wall art, lights, and a window.

The process 300 includes generating, from the image, a set of poorly localized bounding boxes (304). The poorly localized bounding boxes can be generated by the poorly localized bounding box generator 112. The poorly localized bounding box generator 112 can generate one or more poorly localized bounding boxes from the image. For example, the poorly localized bounding box generator 112 may receive the image 206. From the image 205, the poorly localized bounding box generator 112 can generate a set of poorly localized bounding boxes that includes bounding boxes 208, 210, and 212.

Each bounding box of the set of poorly localized bounding boxes may include one or more of: no portion of the depiction of the object; less than a threshold amount of a depiction of the object; or greater than a threshold amount of a depiction of background. The threshold amount of the depiction of the object can include: a minimum threshold percentage of the depiction of the object that is within the bounding box; or a minimum threshold percentage of the bounding box that depicts the object. For example, a poorly localized bounding box may include less than a minimum threshold percentage of the depiction of the object, e.g., less than 50%, less than 60%, or less than 70% of the depiction of the object that is within the bounding box. As an example, bounding box 212 includes 20% of the depiction of the person 202, which is less than an example threshold of 50% of the depiction of the person 202. Therefore, bounding box 212 satisfies criteria for a poorly localized bounding box.

The threshold amount of the depiction of background can include a maximum threshold percentage of pixels of the bounding box that depict background. For example, the maximum threshold percentage of pixels that depict background may be 30%, 40%, 50%, etc. As an example, 80% of pixels of the bounding box 210 depict background, which is greater than an example threshold of 40%. Therefore, bounding box 210 satisfies criteria for a poorly localized bounding box.

In some implementations generating, from the image, the set of poorly localized bounding boxes includes selecting, at random, a plurality of regions of the image. For example, the system can randomly select multiple regions of the image 205, including the region depicted in bounding box 208. The system can determine an amount of overlap between each region of the plurality of regions and the depiction of the object. For example, for the selected region depicted in bounding box 208, the system can determine an overlap of 15% between the region and the depiction of the person 202.

The system can identify a subset of the plurality of regions that are poorly localized based on the amount of overlap between each region and the depiction of the object. For example, based on the overlap of 15% between the region and the depiction of the person 202, the system can identify the region depicted in bounding box 208 as part of a subset of regions that are poorly localized.

The system can generate a bounding box around each region of the identified subset of the plurality of regions. For example, the system can generate the bounding box 208 around the selected region. The system may then use background removal techniques to provide, to the object classifier, only portions of the image within the poorly localized bounding box 208.

In some implementations, generating, from the image, the set of poorly localized bounding boxes includes receiving an instruction to generate a particular number of poorly localized bounding boxes. For example, the poorly localized bounding box generator 112 may receive an instruction to generate thirty poorly localized bounding boxes from the image 106. In response to receiving the instruction to generate the particular number of poorly localized bounding boxes, the poorly localized bounding box generator 112 selects regions of the image 106 that each meet criteria for being poorly localized. The number of selected regions is equal to the particular number of poorly localized bounding boxes. For example, in response to receiving the instruction to generate thirty poorly localized bounding boxes from the image 106, the poorly localized bounding box generator 112 selects thirty regions of the image that each meet criteria for being poorly localized. The poorly localized bounding box generator 112 generates a bounding box around each region of the selected regions. The poorly localized bounding box generator 112 provides the set of thirty poorly localized bounding boxes to the first classifier trainer 120.

In some implementations, generating, from the image, the set of poorly localized bounding boxes includes receiving a ground truth bounding box specified by training data and generating the set of poorly localized bounding boxes based on the ground truth bounding box. For example, images in the image database 102 may include data identifying a ground truth bounding box around an object of interest. As an example, the image 108 may be appended with data that identifies a ground truth, or optimized, bounding box around the animal.

In some implementations, each poorly localized bounding box of the set of poorly localized bounding boxes generated based on the ground truth bounding box includes at least one of: a bounding box that is larger than the ground truth bounding box, a bounding box that includes more of a depiction of background than the ground truth bounding box, or a bounding box that includes less of a depiction of the object than the ground truth bounding box. For example, a poorly localized bounding box may be 20%, 30%, or 40% larger than the ground truth bounding box. In another example, the poorly localized bounding box may include 10% more, 15% more, or 20% more of a depiction of background than the ground truth bounding box. In another example, the poorly localized bounding box may include 15% less, 25% less, or 30% less of a depiction of the object than the ground truth bounding box.

The process 300 includes generating, from the image, a set of accurately localized bounding boxes (306). The accurately localized bounding boxes can be generated by the accurately localized bounding box generator 114. The accurately localized bounding box generator 114 can generate one or more accurately localized bounding boxes from the image. For example, the accurately localized bounding box generator 114 may receive the image 205. From the image 205, the accurately localized bounding box generator 114 can generate a set of accurately localized bounding boxes that includes bounding boxes 214, 216, and 218.

In some implementations, each bounding box of the set of accurately localized bounding boxes includes less than a threshold amount of a depiction of background and one or more of: an entirety of the depiction of the object; or greater than a threshold amount of a depiction of the object. The threshold amount of the depiction of background may include a maximum threshold percentage of the bounding box that depicts background. For example, the maximum threshold percentage of the bounding box that depicts background may be 45%, 55%, or 65%. As an example, the bounding box 218 includes 40% of a depiction of background, which is less than an example maximum threshold of 45% of a depiction of background.

The threshold amount of the depiction of the object can include: a minimum threshold percentage of the depiction of the object that is within the bounding box; or a minimum threshold percentage of the bounding box that depicts the object. For example, the minimum threshold percentage of the depiction of the object may be 70%, 80%, or 90%. As an example, bounding box 218 includes 85% of the depiction of the person 202 within the bounding box, which is greater than an example threshold of 80%. Bounding box 218 also includes less than the threshold amount of a depiction of background, as described above. Therefore, bounding box 218 satisfies criteria for an accurately localized bounding box.

In some implementations, generating, from the image, the set of accurately localized bounding boxes includes selecting, at random, a plurality of regions of the image and determining an amount of overlap between each region of the plurality of regions and the depiction of the object. For example, the system can randomly select multiple regions of the image 205, including the region depicted in bounding box 214. The system can determine an amount of overlap between each region of the plurality of regions and the depiction of the object. For example, for the selected region depicted in bounding box 214, the system can determine an overlap of 50% between the region and the depiction of the person 202.

The system can identify a subset of the plurality of regions that are accurately localized based on the amount of overlap between each region and the depiction of the object. For example, based on the overlap of 50% between the region and the depiction of the person 202, the system can identify the region depicted in bounding box 214 as part of a subset of regions that are accurately localized.

The system can generate a bounding box around each region of the identified subset of the plurality of regions. For example, the system can generate the bounding box 214 around the selected region. The system may then use background removal techniques to provide, to the object classifier, only portions of the image within the accurately localized bounding box 214.

In some implementations, generating, from the image, the set of accurately localized bounding boxes includes receiving an instruction to generate a particular number of accurately localized bounding boxes. For example, the accurately localized bounding box generator 114 may receive an instruction to generate twenty accurately localized bounding boxes from the image 106. In response to receiving the instruction to generate the particular number of accurately localized bounding boxes, accurately localized bounding box generator 114 selects regions of the image 106 that each meet criteria for being accurately localized. The number of selected regions is equal to the particular number of accurately localized bounding boxes. For example, in response to receiving the instruction to generate twenty accurately localized bounding boxes from the image 106, the accurately localized bounding box generator 114 selects twenty regions of the image that each meet criteria for being accurately localized. The accurately localized bounding box generator 114 generates a bounding box around each region of the selected regions. The accurately localized bounding box generator 114 provides the set of twenty accurately localized bounding boxes to the second classifier trainer 126.

In response to receiving the instruction to generate the particular number of accurately localized bounding boxes, the system can select regions of the image that each meet criteria for being accurately localized. The number of selected regions is equal to the particular number of accurately localized bounding boxes. The system can generate a bounding box around each region of the selected regions.

The process 300 includes training, at a first learning rate and using the poorly localized bounding boxes, an object classifier to classify the object in the image (308). In a first training stage, the first classifier trainer 120 trains the object classifier at a first learning rate. The first classifier trainer 120 may train the object classifier at a first learning rate of, for example, $1\times10^{-3}$. The first classifier trainer 120 trains the object classifier with the poorly localized bounding boxes, e.g., the set of poorly localized bounding boxes 204. By training the object classifier on the poorly localized bounding boxes, the object classifier can learn to more accurately classify images with any amount of an object of interest present in the image.

In some implementations, training, at the first learning rate and using the poorly localized bounding boxes, the object classifier to classify the object in the image includes providing, to the object classifier, only portions of the image within the poorly localized bounding boxes.

In some implementations, training the object classifier to classify the object in the image includes providing, to the object classifier, a ground truth bounding box specified by training data. For example, the ground truth bounding box may be an accurately localized bounding box or an optimized bounding box. The first classifier trainer 120 can train the object classifier by comparing the classification of the object in the poorly localized bounding box to the ground truth. Based on the comparison with ground truth, the first classifier trainer 120 can update weights of the classifier neural network model at the first learning rate.

A learning rate controls an amount by which weights of a neural network model are updated with each training example or batch of training examples. Training the object classifier at the first learning rate updates the weights of the neural network model faster than training the object classifier at the second learning rate that is lower than the first learning rate. In some implementations, the first learning rate is $1\times10^{-3}$.

The process 300 includes training, at a second learning rate that is lower than the first learning rate, and using the accurately localized bounding boxes, the object classifier to classify the object in the image (310). In the second training stage, the second classifier trainer 126 trains the object classifier at a second learning rate that is lower than the first learning rate. The second classifier trainer 126 may train the object classifier at a second learning rate of, for example, $1\times10^{-6}$. The second classifier trainer 126 trains the object classifier with the accurately localized bounding boxes, e.g., the set of accurately localized bounding boxes 206. By training the object classifier on the accurately localized bounding boxes, the accuracy of the object classifier can be refined and can learn to accurately distinguish between objects of interest and background, reducing false alarm detections.

In some implementations, training, at the second learning rate that is lower than the first learning rate, and using the accurately localized bounding boxes, the object classifier to classify the object in the image includes providing, to the object classifier, only portions of the image within the accurately localized bounding boxes In some implementations, training the object classifier to classify the object in the image includes providing, to the object classifier, a ground truth bounding box specified by training data. For example, the ground truth bounding box may be an accurately localized bounding box or an optimized bounding box. The second classifier trainer 126 can train the object classifier by comparing the classification of the object in the accurately localized bounding box to the ground truth. Based on the comparison with ground truth, the second classifier trainer 126 can update weights of the classifier neural network model at the second learning rate.

The learning rate controls an amount by which weights of a neural network model are updated with each training example or batch of training examples. Training the object classifier at the second learning rate updates the weights of the neural network model slower than training the object classifier at the first learning rate that is higher than the first learning rate. In some implementations, the second learning rate is $1\times10^{-6}$.

The process 300 includes performing object classification with the trained object classifier (312). The object classifier can be used for inference, e.g., to classify objects in images for which the ground truth is unknown. The object classifier can be used in conjunction with a camera. The camera can capture images, and the object classifier can classify objects within the images. In some examples, the object classifier can classify objects within the images in real-time as the camera captures the images. The object classifier model can more accurately classify objects of interest and differentiate objects of interest from background, compared to a single-stage trained classifier model or a classifier model trained only with accurately localized bounding boxes.

In some implementations, the process 300 includes receiving a second image that includes a depiction of an object. For example, the system may receive the image 104 that includes a depiction of a vehicle. The system can provide, to the trained object classifier, the second image. The system may receive an indication that the object classifier classified the object in the second image. For example, the system can receive an indication that the trained object classifier classified the vehicle in the image 104. The object classifier may classify the vehicle in the image 104 by generating a bounding box around the vehicle and applying a label, "vehicle." Based on the indication that the object classifier classified the object in the second image, the system can perform one or more actions. For example, based on the indication that the object classifier classified the vehicle in the image 104, the system can perform an action, e.g., by sending a notification to a user device, by transmitting an instruction to illuminate a light at a property where the vehicle is located, or by transmitting an instruction to open a garage door at a property where the vehicle is located.

Figure 4:
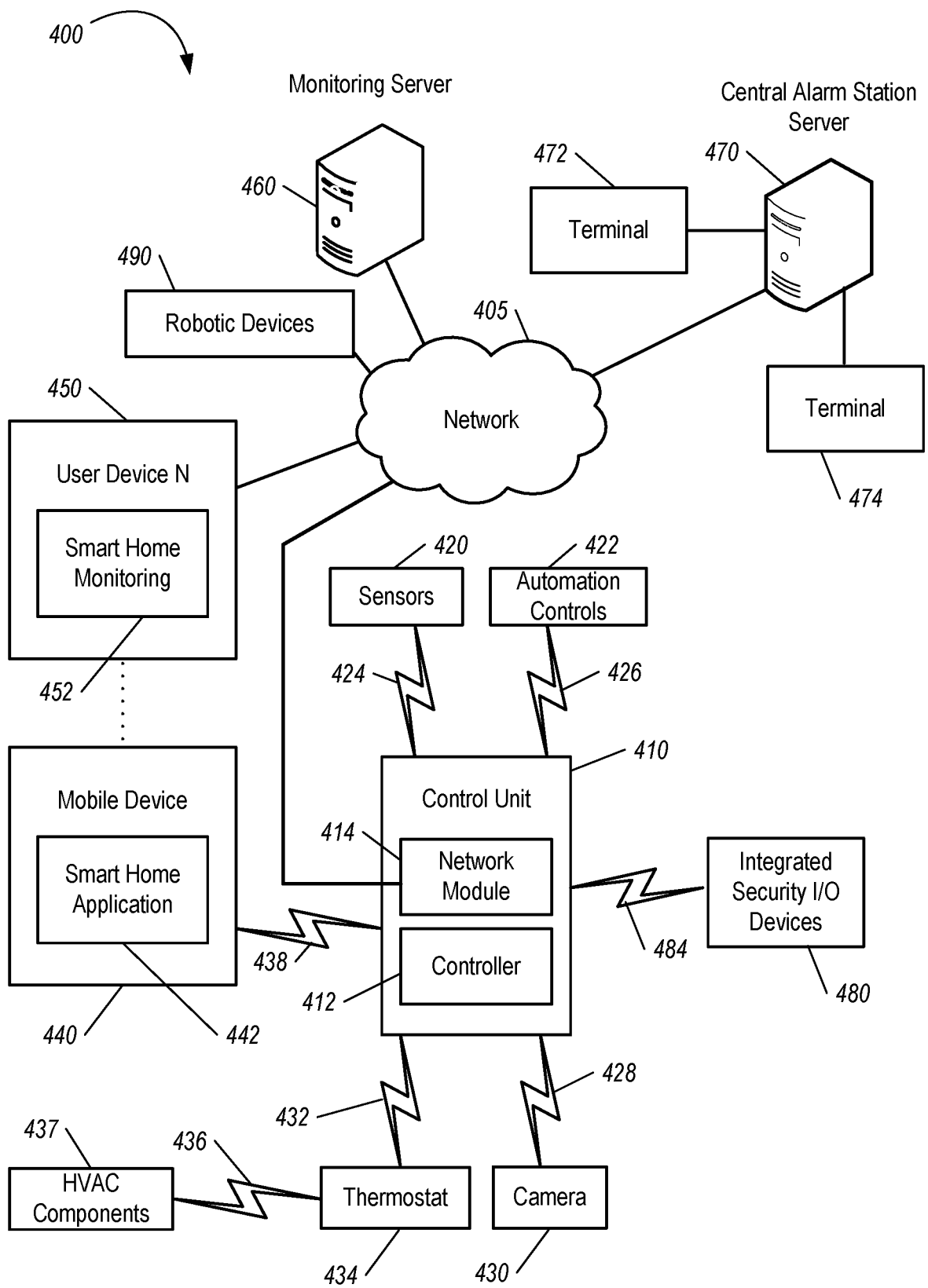
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a camera, lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   training, at a first learning rate and using a poorly localized bounding box that (a) circumscribes at least part of an object depicted in an image and (b) has one or more of (i) a greater area of background content than an accurately localized bounding box for the object or (ii) a percentage of the object circumscribed by the poorly localized bounding box that does not satisfy a percentage threshold that is satisfied by an accurately localized bounding box, an object classifier to classify the object depicted in the image;
   training, at a second learning rate that is different than the first learning rate and using the accurately localized bounding box, the object classifier to classify the object depicted in the image; and
   storing the object classifier in memory for use classifying one or more objects depicted in another image.

2. The method of claim 1, comprising:
   providing, to a system, the object classifier for use classifying one or more objects depicted in another image.

3. The method of claim 2, wherein providing the object classifier to the system causes the system to perform one or more actions in response to determining, using the object classifier, that an object of a predetermined type is likely depicted in the other image.

4. The method of claim 1, wherein the percentage threshold comprises (i) a minimum threshold percentage of the depiction of the object that is within the bounding box or (ii) a minimum threshold percentage of the bounding box that depicts the object.

5. The method of claim 1, wherein:
   training, at the first learning rate and using the poorly localized bounding box, the object classifier to classify the object in the image comprises providing, to the object classifier, only portions of the image within the poorly localized bounding box; and
   training, at the second learning rate that is different than the first learning rate and using the accurately localized bounding boxes, the object classifier to classify the object in the image comprises providing, to the object classifier, only portions of the image within the accurately localized bounding boxes.

6. The method of claim 1, wherein:
   the object classifier includes a neural network model; and
   a learning rate controls an amount by which weights of the neural network model are updated with each training example or batch of training examples.

7. The method of claim 1, comprising:
   determining a plurality of regions in the image;
   determining, for each region in the plurality of regions, an amount of overlap of the region with the object;
   determining, for each region in the plurality of regions, whether the amount of overlap of the region with the object satisfies a threshold;
   in response to determining for a first region from the plurality of regions that the amount of overlap of the first region with the object does not satisfy the threshold, uses the first region as the poorly localized bounding box; and
   in response to determining for a second region from the plurality of regions that the amount of overlap of the second region with the object satisfies the threshold, uses the second region as the accurately localized bounding box.

8. A system comprising one or more computers and one or more storage devices on which are stored instructions that are operable, when executed by the one or more computers, to cause the one or more computers to perform operations comprising:

maintaining, in memory, an object classifier that was trained i) at a first learning rate and using a poorly localized bounding box that (a) circumscribes at least part of an object depicted in a training image and (b) has one or more of (i) a greater area of background content than an accurately localized bounding box for the object or (ii) a percentage of the object circumscribed by the poorly localized bounding box that does not satisfy a percentage threshold that is satisfied by an accurately localized bounding box and ii) at a second learning rate that is different than the first learning rate and using the accurately localized bounding box;

accessing an image of a region that was captured by a camera;

classifying, using the object classifier, one or more objects depicted in the image; and performing an action for the region using the classification of the one or more objects depicted in the image.

9. The system of claim 8, wherein the percentage threshold comprises (i) a minimum threshold percentage of the depiction of the object that is within the bounding box or (ii) a minimum threshold percentage of the bounding box that depicts the object.

10. The system of claim 8, wherein:
the object classifier was trained, at the first learning rate and using the poorly localized bounding box, to classify the object using only portions of the image within the poorly localized bounding box; and
the object classifier was trained, at the second learning rate that is different than the first learning rate and using the accurately localized bounding box, to classify the object using only portions of the image within the accurately localized bounding box.

11. The system of claim 8, wherein:
the object classifier includes a neural network model; and
a learning rate controls an amount by which weights of the neural network model are updated with each training example or batch of training examples.

12. The system of claim 8, wherein performing the action comprises opening a gate or a door in response to determining that the one or more objects include an object of a predetermined type.

13. The system of claim 8, wherein performing the action comprises sending a command to a device for the region.

14. One or more non-transitory computer storage media encoded with instructions that, when executed by one or more computers, cause the one or more computers to perform operations comprising:
training, at a first learning rate and using a poorly localized bounding box that (a) circumscribes at least part of an object depicted in an image and (b) has one or more of (i) a greater area of background content than an accurately localized bounding box for the object or (ii) a percentage of the object circumscribed by the poorly localized bounding box that does not satisfy a percentage threshold that is satisfied by an accurately localized bounding box, an object classifier to classify the object depicted in the image, the poorly localized bounding box at least partially overlapping an area of the accurately localized bounding box with respect to the image;
training, at a second learning rate that is different than the first learning rate and using the accurately localized bounding box that circumscribes at least part of the object depicted in the image, the object classifier to classify the object depicted in the image; and
storing the object classifier in memory for use classifying one or more objects depicted in another image.

15. The computer storage media of claim 14, the operations comprising:
providing, to a system, the object classifier for use classifying one or more objects depicted in another image.

16. The computer storage media of claim 15, wherein providing the object classifier to the system causes the system to perform one or more actions in response to determining, using the object classifier, that an object of a predetermined type is likely depicted in the other image.

17. The computer storage media of claim 14, wherein the percentage threshold comprises (i) a minimum threshold percentage of the depiction of the object that is within the bounding box or (ii) a minimum threshold percentage of the bounding box that depicts the object.

18. The computer storage media of claim 14, wherein:
training, at the first learning rate and using the poorly localized bounding box, the object classifier to classify the object in the image comprises providing, to the object classifier, only portions of the image within the poorly localized bounding box; and
training, at the second learning rate that is different than the first learning rate and using the accurately localized bounding box, the object classifier to classify the object in the image comprises providing, to the object classifier, only portions of the image within the accurately localized bounding box.

19. The computer storage media of claim 14, wherein:
the object classifier includes a neural network model; and
a learning rate controls an amount by which weights of the neural network model are updated with each training example or batch of training examples.

20. The computer storage media of claim 14, the operations comprising:
determining a plurality of regions in the image;
determining, for each region in the plurality of regions, an amount of overlap of the region with the object;
determining, for each region in the plurality of regions, whether the amount of overlap of the region with the object satisfies a threshold;
in response to determining for a first region from the plurality of regions that the amount of overlap of the first region with the object does not satisfy the threshold, uses the first region as the poorly localized bounding box; and
in response to determining for a second region from the plurality of regions that the amount of overlap of the second region with the object satisfies the threshold, uses the second region as the accurately localized bounding box.

\* \* \* \* \*